United States Patent
Browne et al.

(10) Patent No.: US 8,864,323 B2
(45) Date of Patent: Oct. 21, 2014

(54) ACTIVE MATERIAL ACTUATED MIRROR ASSEMBLIES

(75) Inventors: Alan L. Browne, Grosse Pointe, MI (US); Nancy L. Johnson, Northville, MI (US); William C. Bisnack, Macomb, MI (US); Kenneth A. Lucas, Lake Orion, MI (US); Charles R. Quinn, Pleasant Ridge, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 568 days.

(21) Appl. No.: 13/113,102

(22) Filed: May 23, 2011

(65) Prior Publication Data

US 2011/0222176 A1  Sep. 15, 2011

(51) Int. Cl.
*G02B 5/08* (2006.01)
*B60R 1/072* (2006.01)
*B60R 1/074* (2006.01)

(52) U.S. Cl.
CPC ............... *B60R 1/074* (2013.01); *B60R 1/072* (2013.01)

USPC .......................................... 359/841

(58) Field of Classification Search
CPC ............ B60R 1/02; B60R 1/025; B60R 1/04; B60R 1/06; B60R 1/062; B60R 1/064; B60R 1/066; B60R 1/072; B60R 1/074; B60R 1/068
USPC ........................................ 359/841, 871–877
See application file for complete search history.

(56) References Cited

U.S. PATENT DOCUMENTS

| 4,626,085 | A | 12/1986 | Suzuki |
| 7,287,867 | B2* | 10/2007 | Wellington et al. ........... 359/877 |
| 2004/0246608 | A1 | 12/2004 | Wellington et al. |

FOREIGN PATENT DOCUMENTS

JP       08310301       11/1996

* cited by examiner

*Primary Examiner* — Euncha Cherry (57) ABSTRACT

A mirror assembly includes a reflective surface disposed within a housing, and an actuator in operative communication with at least a portion of the housing, wherein the actuator and/or housing comprises an active material element configured to cause or selectively enable the housing and surface to be manipulated.

20 Claims, 3 Drawing Sheets

ACTIVE MATERIAL ACTUATED MIRROR ASSEMBLIES

BACKGROUND

This disclosure relates generally to mirrors and in particular to mirror assemblies incorporating active materials.

Motor vehicles commonly include minors with which the driver can view the conditions to the sides and/or rear of the vehicle within certain fields of view as dictated by the positioning of the mirrors. The position of these mirrors can be adjusted either manually (e.g., by means of a ball-and-socket pivoting mechanism), or automatically (e.g., using a mechanical or electro-mechanical remote joystick controller). It is appreciated that conventional mirror assemblies, and more particularly, with respect to the present invention, mirror housings incorporate automatic positional adjustment, so as to provide more convenience, and be less labor intensive, and precise in positional control, an actuator is necessary to permit movement of the mirror. Current actuators may have high part counts, loud motors, complex circuitry, and may be expensive to fabricate.

There accordingly remains a need in the art for new and improved mirror assemblies. It would be particularly desirable if these mirror assemblies provided the advantages of automatic mirror assemblies over their manual counterparts while simultaneously offering performance advantages (e.g., fewer parts, quieter, simpler in design, and/or less expensive to manufacture) over existing automatic mirror assemblies.

BRIEF SUMMARY

A mirror assembly includes a reflective surface disposed within a housing; an actuator in operative communication with at least a portion of the housing, wherein the actuator comprises an active material operable to translate or enable the translation of at least a portion of the housing, so as to modify the surface position and/or reflective angle, and in a preferred embodiment, further includes a controller in operative communication with the active material, wherein the controller is operable to selectively apply an activation signal to the active material. As such, the invention is useful for providing an autonomously manipulable mirror assembly able to achieve at least first and second positions and/or reflective angles in a more efficient, quiet, robust, and simplistic manner, in comparison to prior art adjustable mirror assemblies.

The above described and other features, including the use of active material wires, springs, gears, and/or pulleys to drive said at least portion of the housing, are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein is an autonomously manipulable mirror assembly 10, and method of use, which, in contrast to the prior art, utilizes active material actuation to selectively adjust a position and/or reflective angle (from the viewer's vantage point) of a mirror surface 12. Although reference will be made herein to motor vehicle applications, it is contemplated that the active mirror assembly 10 can be employed in any application which calls for positional and/or reflective angle control of a mirror surface 12 (i.e. to control light reflection). For motor vehicle applications, the inventive active mirror assembly 10 is particularly suitable to more efficiently effect power folding of side view minors 10a, extension of wide-load mirrors 10b, and manipulation (e.g., swiveling, tilting, etc.) of side and rear view mirrors 10c (FIGS. 1-5), in comparison to prior art power mirror assemblies. The illustrated mirror assemblies 10 are exemplary only and are not intended to be limited to any particular shape, size, or configuration. The mirror assemblies 10 disclosed herein may function in numerous ways, a few of which are described below. Other functions and/or uses will be readily recognized by those skilled in the art in view of this disclosure.

The present application relates to U.S. application Ser. No. 11/078,644, which is entitled ACTIVE MIRROR ASSEMBLIES, was filed on Mar. 11, 2005, and is incorporated herein in its entirety.

As used herein, the terms "first", "second", and the like do not denote any order or importance, but rather are used to distinguish one element from another; and the terms "the", "a", and "an" do not denote a limitation of quantity, but rather denote the presence of at least one of the referenced item. Directional descriptors used herein are with reference to the motor vehicle 100. Furthermore, all ranges disclosed herein are inclusive of the endpoints and independently combinable.

The term "active material" as used herein generally refers to a material that exhibits a reversible change in a fundamental (i.e., chemical or intrinsic physical) property when exposed to or occluded from an activation signal, examples of such signals being thermal, electrical, magnetic, mechanical, pneumatic, and the like. A particularly suitable class of active materials comprises shape memory materials. These materials exhibit a shape memory effect. Specifically, after being deformed pseudoplastically, they can be restored to their original shape in response to the activation signal. Suitable shape memory materials include, without limitation, shape memory alloys (SMAs), ferromagnetic SMAs, and shape memory polymers (SMPs). A second class of active materials can be considered as those that exhibit a change in at least one attribute when subjected to an applied activation signal but revert back to their original state upon removal of the applied activation signal. Active materials in this category include, but are not limited to, piezoelectric materials, electroactive polymers (EAPs), dielectric polymers, magnetorheological fluids and elastomers (MR), electrorheological fluids (ER), composites of one or more of the foregoing materials with non-active materials such as ionic polymer metal composites (IPMCs), combinations comprising at least one of the foregoing materials, and the like.

The activation signal and its duration are dependent on the type, composition, and/or configuration of the active material. For example, a magnetic and/or an electrical signal may be applied for changing the property of the active material fabricated from magnetostrictive materials. A thermal signal may be applied for changing the property of the active material fabricated from shape memory alloys and/or shape memory polymers. An electrical signal may be applied for changing the property of the active material fabricated from EAPs, piezoelectrics, and/or IPMCs.

As shown in the illustrated embodiments, the active mirror assembly 10 generally includes a reflective surface 12 disposed within and fixedly supported by a housing 14. That is to say, the mirror surface 12 is rigidly coupled to the housing 14 so as to effect congruent motion therewith; it is appreciated, however, that the surface 12 may be further manipulable relative to and removable from the housing 14. An actuator 16 comprising at least one active material element 18 is in operative communication with or defines at least a portion of the housing 14. In response to activation, the element 18 directly causes or enables said at least a portion of the housing 14 to manipulate (i.e., translate, pivot, fold, etc.), and the reflective surface 12 to move from first to second, and more preferably between a plurality of positions or angles.

Figure 1:
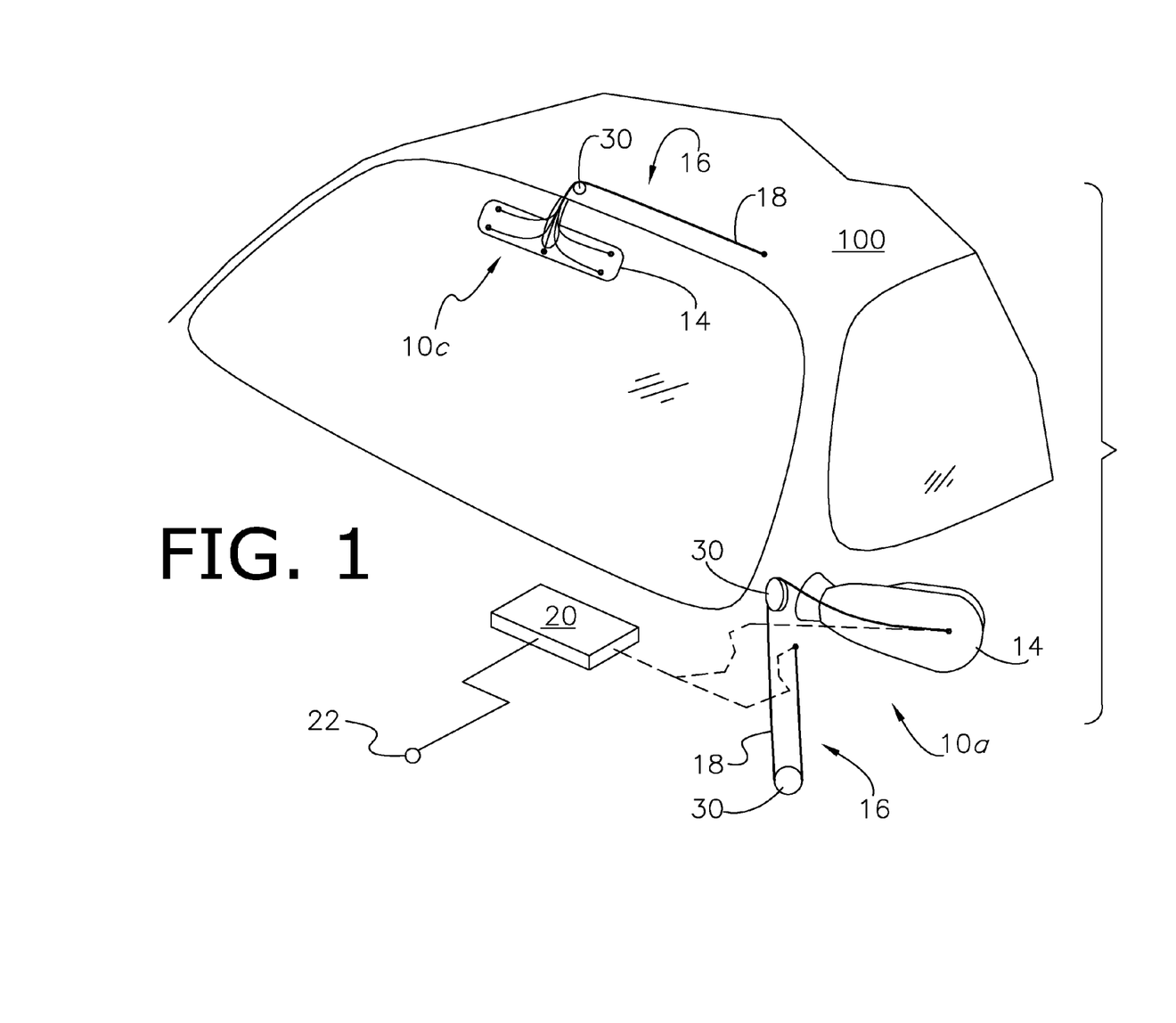
FIG. 1 is a perspective view of a vehicle comprising rearview and side mirror assemblies further comprising a housing, an active material actuator drivenly coupled to the housing, and internally disposed within the housing and vehicle, and a controller and sensor communicatively coupled to the actuator, in accordance with a preferred embodiment of the invention.

In a preferred embodiment, the active material element 18 is in operative communication with a controller 20 operable to produce the activation signal, so as to activate the element 18 (FIG. 1). That is to say, the controller 20 is further coupled to a power source (not shown) operable to produce the signal, such as the charging system of the vehicle 100. More preferably, the mirror assembly 10 is communicatively coupled to a sensor 22 in operative communication with the controller 20, wherein the sensor 22 provides information to the controller 20, and the activation signal is selectively applied to effect the reversible change only when the information is provided. The controller 20 is preferably configured to implement open-loop control schemes that are used to actuate the assembly as desired.

In a preferred scheme, a side view or wide-load mirror assembly 10a,b constructed as proposed, may be manipulated to minimize a blind spot during reverse motion of the vehicle 100. More particularly, when the vehicle 100 is shifted into reverse, the housing 14 and reflective surface 12 may be configured to tilt downward to provide the driver with a view of the adjacent curb or other such low-lying (i.e., tire-level) rearward obstruction. Once the vehicle 100 is shifted out of reverse, the activation signal is discontinued, so that the reflective surface 12 returns to its first position or angle. Alternatively, a side view or wide-load mirror assembly 10a,b may be configured to achieve a modified position in order to minimize a blind spot upon indication that the vehicle 100 is about to perform a lane change (e.g., when a turn signal is actuated, the steering wheel is fully rotated, etc.). Upon the indication that the vehicle 100 is turning left (or right), the reflective surface 12 of the left (or right) side view mirror assembly 10a may tilt outward to provide the driver with an increased field of view. In lieu of, or addition to sensing that the vehicle 100 is about to change direction, a side view mirror assembly 10a may comprise a motion and/or distance sensor 22 configured to detect another vehicle within the associated blind spot. Finally, in yet another example, the actuator 16 and/or the housing 14, which may be activated to change the position and/or angle of the reflective surface 12 upon detection by the sensor 22 of an intensity of light indicative of night time driving.

In an exemplary embodiment, the actuator 16 presents a linear mechanical response to the activation signal. Suitable linear mechanical actuators 16 can be formed of SMAs, ferromagnetic SMAs, SMPs, EAPs, piezoelectrics, IPMCs, or combinations comprising at least one of the foregoing active materials. For example, an actuator 16 consisting essentially of SMA may be in the form of a spring, wire, ribbon, or similar form that has a mechanical response upon the application and/or removal of heat, such as Joule heating or air convection, wherein the length, diameter, and quantity are determined from the measured mirror loads. These types of actuators 16 can provide displacement or induce a force when heated within constant load or constant deflection conditions, respectively.

Actuators 16 may be provided in antagonistic pairs or in opposition to a biasing or return mechanism 24 that causes an opposed movement. That is to say, where the actuator 16 causes the assembly 10 to fold, the mechanism 24 causes it to deploy when the element 18 is deactivated, and vice-versa. In another embodiment, actuators 16 may comprise different active materials to provide a zero-power hold of the attained shape and/or position.

Figures 2, 3B:
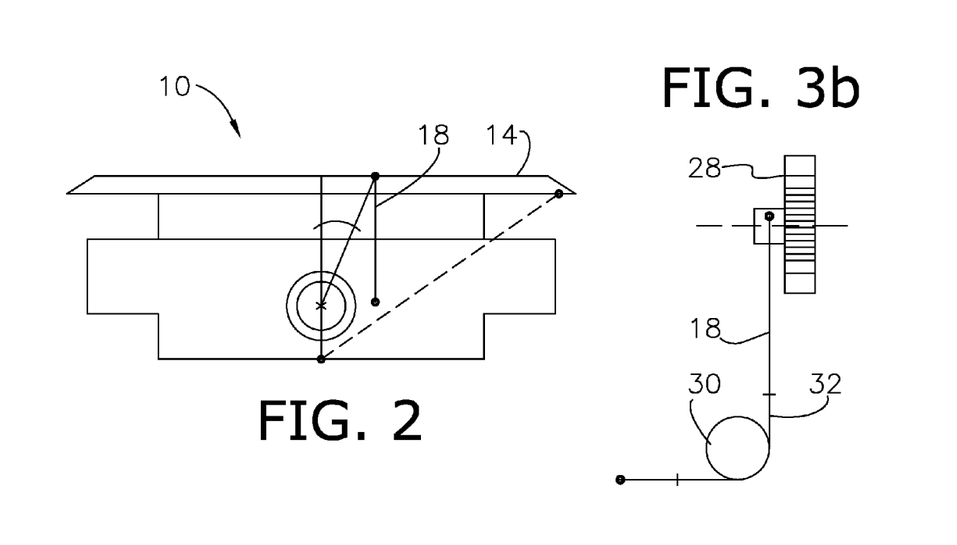
FIG. 2 is an elevation of a mirror assembly including a pivotal housing, and an active material actuator drivenly coupled to the housing, in accordance with a preferred embodiment of the invention.
FIG. 3b is an elevation of a portion of an active material actuator including a gear transmission, an active material wire drivenly coupled to the transmission, and entrained by a pulley, so as to effect vertical tilting, in accordance with a preferred embodiment of the invention.

In the embodiments shown in FIGS. 1 and 2, the housing 14 defines a pivot axis, and the actuator 16 is configured to directly cause at least a portion of the housing 14 to pivot about the axis. More particularly, the portion 14a of the housing 14 securing the surface 12 is pivotally coupled to a fixed portion 14b of the housing or attached structure (e.g., vehicle door via power mirror connector, mounting screws, and clip as is known in the art). Rotation of the housing 14 in FIGS. 1 and 2 effects inward folding, so as to reduce the maximum lateral dimension of the vehicle 100, and outward extension where mirror usage is desired. The actuator 16 includes at least one shape memory element (e.g., SMA wire or spring, EAP tendon) 18 drivenly coupled to the moveable portion 14a of the housing and operable to effect the afore-described moment about the axis.

More preferably, the actuator 16 includes a plurality of elements 18 connected to the housing 14, and configured to cause differing angular translations about the axis, so as to provide greater than two-position manipulation. For example, and as shown in FIG. 1, a plurality of electrically and thermally isolated elements 18 may be configured, either individually or cooperatively, to cause swivel/tilting in the up, down, left, right, left-down, left-up, right-down, right-up directions, wherein a corresponding subset of elements 18 are activated. It is appreciated that the non-activated elements present sufficient dimension and/or enough slack to enable the assembly 10 to tilt in each of the attainable directions, and that the universal joint of the rearview mirror 10c preferably presents sufficient resistance to maintain the attained manipulation after all elements 18 are deactivated.

FIG. 2 shows a different example, wherein plural wires 18 are connected to the housing 14 equidistance from the axis. Here, it is appreciated that a gimbaled mirror mount (not shown) is preferably provided to facilitate vertical plus horizontal rotation. By attaching the SMA wires 18 at the nearest points to center (shown as the vertically oriented wires and in solid line type in FIG. 2), mechanical advantage is obtained that will rectify the stroke of the wire actuator (approximately 4% of the wire length) to achieve a 20° rotation. As the wires are placed farther from the axis (as suggested in hidden-line type in FIG. 2), longer stroke and consequently a longer wire length will be required to affect the same desired rotation. A second, antagonistic set of wires 18 (not shown) would be placed symmetrically on the opposite half to enable both positive and negative rotation. Similarly, it is appreciated that the wires 18 may be attached in a bow-string configuration to create a small mechanical advantage that increases stroke proportional to its trigonometric characteristics.

Figure 3A:
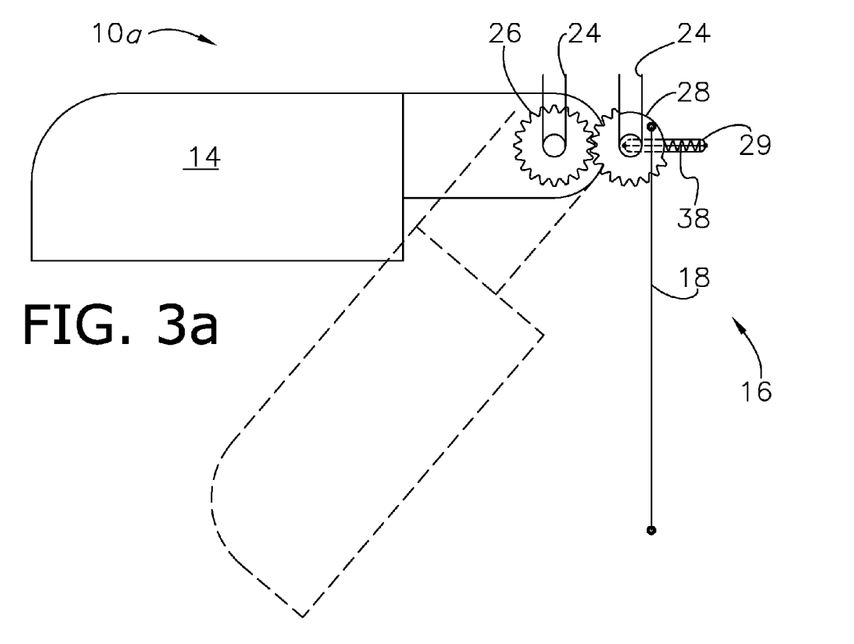
FIG. 3a is a top view of a folding mirror assembly including an active material actuator comprising a gear transmission, an active material wire drivenly coupled to the transmission, and return springs drivenly coupled to the transmission, in accordance with a preferred embodiment of the invention.

More preferably, the actuator 16 further includes a transmission intermediate the element 18 and housing 14 that is operable to magnify stroke or force. In FIGS. 3a,b, for example, the actuator 16 includes a driven gear 26 concentrically aligned with the pivot axis, an input gear 28 intermeshed with the driven gear 26, and a shape memory wire 18 drivenly coupled to the input gear 28. As shown, the mechanical advantage measured at the distal end of the mirror assembly 10 is based upon the operative diameter of the gears 26,28 and length of the housing portion 14a. Where the element 18 is connected to the top half of the input gear 28, it is appreciated that the actuator 16 causes the mirror assembly 10 to fold as shown in FIG. 3a; and where connected to the bottom half, causes the mirror assembly 10 to deploy. Finally, a return mechanism, such as a torsion spring 24a coaxially aligned with the axis of the driven gear 26, is preferably included to effect return of the housing 14 once the element 18 is deactivated (or activated).

In a preferred embodiment, the input gear 28 is able to selectively disengage the driven gear 26, so as to enable the immediate return of the housing portion 14a. In FIG. 3a, for example, the input gear 28 is configured to float within a linear slot 29, and is further coupled to a second active material element (SMA wire) 38; the second element 38 when activated causes the input gear 28 to translate within the slot 29 and disengage the driven gear 26, and a biasing spring housed within the slot 29 to store energy through compression. It is appreciated that the main active material element 18 in this configuration must be sufficiently flexible to accommodate the floating action of the input gear 28. Once the housing 14 returns, the second element 38 may be deactivated so as to enable the gears 26,28 to reengage. First, however, a second return mechanism (such as a second torsion spring 24b drivenly coupled to the input gear 28) is preferably included that functions to reset the input gear 28 when the gears 26,28 are disengaged.

It is appreciated that at least one pulley 30 or otherwise structure, may be added to redirect the resultant motion and/or increase wire length (FIGS. 1 and 3b). For example, and as shown in FIG. 3b, a vertical pulley 30 may be positioned to bend an otherwise horizontal SMA wire 18 just prior to contacting a vertically oriented input gear 28, so as to effect vertical tilting. Where a pulley 30 or otherwise structure is engaged, the actuator 16 preferably includes a steel cable 32 longitudinally coupled to and more durable and than the wire 18. In comparison to the wire 18, the preferred cable 32 also produces less friction loss during operation.

Figure 4A:
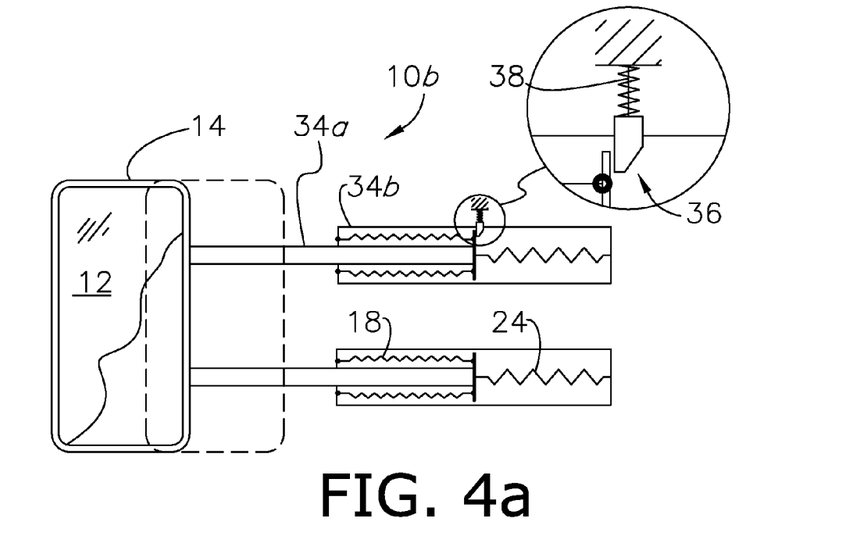
FIG. 4a is an elevation of an extending mirror assembly including telescoping members, an active material actuator comprising an active material spring drivenly coupled to the members, a return spring, and a spring-biased latch, shown in enlarged caption view, having an active material release, in accordance with a preferred embodiment of the invention.

In another embodiment, the housing 14 may include telescoping parts 34a,b, and activation of the element 18 causes or enables the parts 34a,b to relatively extend. As shown in the wide-load mirror embodiment of FIGS. 4a,b, horizontally extending parts 34a,b may be interconnected by one or more shape memory wires or springs 18. In FIG. 4a, two active material springs 18 (FIG. 4b) each presents first and second spring moduli corresponding to activation and deactivation, wherein the first but not the second modulus results in relative translation between the parts 34a, b. More particularly, first and second SMA springs 18 are shown drivenly coupled to the interiorly disposed part 34a; and a return spring 24 is also coupled to the disposed part 34a antagonistic to the SMA springs 18 (FIG. 4a). In the normally Martensite state the springs 18 are unable to overcome the return spring 24, which thereby retains the assembly 10b in the retracted condition (shown in hidden line type). When activated to achieve the Austenite state the springs 18 generate a greater spring modulus that overcomes the spring modulus of the return spring 24. This causes the housing 14 and surface 12 to extend, as the SMA springs 18 collapse and stretch the return spring 24.

Figure 4B:
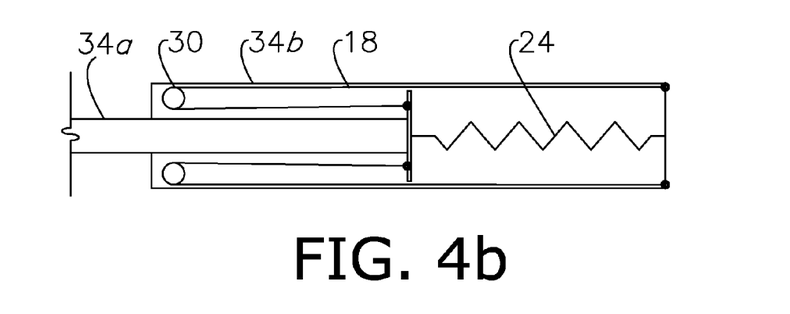
FIG. 4b is an elevation of an active material actuator adapted for use with the telescoping members shown in FIG. 4a, and including first and second active material wires each entrained by first and second pulleys, and further including a return spring, in accordance with a preferred embodiment of the invention.

In FIG. 4b, activation and contraction of an SMA wire 18 causes the parts 34a,b to relatively translate. As further shown, a pulley or otherwise structure 30 may be added to extend the wire length and/or redirect the force vector acting upon the assembly 10, as necessary. Again, a return mechanism (e.g., extension spring) 24 is drivenly coupled to the parts 34a,b antagonistic to the wires 18, so as to return the assembly 10 to the previous condition, upon deactivation.

As shown in FIG. 4a, a latch 36 may be used to selectively engage the parts 34a,b in the extended or retracted conditions, so as to effect zero-power hold. Once, actuation is complete, for example, the latch 36 may be caused to engage the interiorly disposed part 34a to retain it in the extended condition, by its own biasing spring drivenly coupled thereto (FIG. 4a). Preferably, a second active material element (e.g., a second SMA wire) 38 is used to release the latch 36, thereby enabling the parts 34a,b to return under the influence of the return spring 24. Alternatively, it is appreciated that a ratchet (not shown) may be used to further retain the parts 34a,b in a plurality of intermediate stroke conditions.

Figure 5:
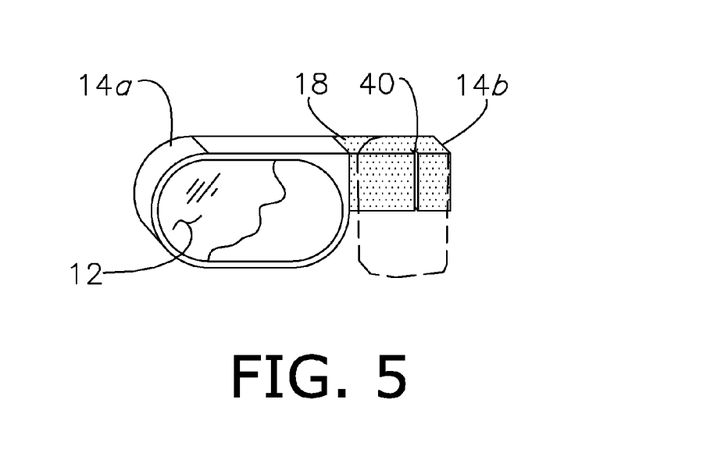
FIG. 5 is a perspective view of a mirror assembly including a foldable housing comprising a shape memory active material, in extended and stowed (shown in hidden line type) conditions, in accordance with a preferred embodiment of the invention.

In another embodiment, the housing 14 is formed at least in part by a shape memory material element 18. The active material may be SMP, piezoelectric composite, EAP, or the like, and may take the form of a stirrup, sheet or laminated sheet composing the housing 14. Producing the activation signal is operable to change the shape and/or malleability of the portion of the housing 14 comprising the same, so that the reflective surface 12 is manipulated (FIG. 5). Here, the material itself may effect the actuator 16, utilizing its shape memory capability to drive the assembly 10 to the desired configuration. Alternatively, an interiorly disposed actuator (not shown) such as previously described, or conventional, may be used to drive the assembly 10; in such case, active material actuation of the housing material 18 is used only to lock in an attained configuration, so as to provide zero-power hold.

In a preferred embodiment, the housing 14 forms the external structure of the vehicle side mirrors, within which the mirror surface 12 is disposed; and the active material element 18 comprises that portion of the side mirror 10 adjacent the door (FIG. 5), such that the assembly 10 is selectively foldable in that area. Thus, the housing 14 may present a resistance to folding and the active material element 18 formed thereof may function to modify the resistance, so as to selectively enable folding. More preferably, to facilitate and control folding, the housing 14 may define one or more fold lines (i.e., inset, groove, etc.) 40, along which activation causes or enables said at least portion 14a to fold (FIG. 5).

As previously described, suitable active materials include, without limitation, shape memory alloys (SMAs), ferromagnetic SMAs, shape memory polymers (SMPs), piezoelectric materials, electroactive polymers (EAPs), magnetorheological fluids and elastomers (MR), electrorheological fluids and elastomers (ER), composites of one or more of the foregoing materials with non-active materials such as ionic polymer metal composites (IPMCs), combinations comprising at least one of the foregoing materials, and the like.

Suitable shape memory alloys can exhibit a one-way shape memory effect, an intrinsic two-way effect, or an extrinsic two-way shape memory effect depending on the alloy composition and processing history. The two most commonly utilized phases that occur in shape memory alloys are often referred to as martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (MO. Generally, the shape memory alloys are softer and more easily deformable in their martensitic phase and are harder, stiffer, and/or more rigid in the austenitic phase. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100.degree. C. to below about −100.degree. C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or elastic modulus properties, damping capacity, superelasticity, and the like. Selection of a suitable shape memory alloy composition depends on the temperature range where the component will operate.

Suitable magnetic materials for use in magnetic SMAs (or FSMAs) include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Shape memory polymers (SMPs) generally refer to a group of polymeric materials that exhibit a change in a property, such as an elastic modulus, a shape, a dimension, a shape orientation, or a combination comprising at least one of the foregoing properties upon application of a thermal activation signal. Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n-1) soft segments, wherein the hard segment has a higher thermal transition temperature than any soft segment. Thus, SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized, by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, however, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature. interval of interest. In one embodiment, component B becomes stronger at low temperatures compared to component A, while component A is stronger at high, temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0.degree. C. to about 300.degree. C. or above. A temperature for shape recovery (i.e., a soft segment thermal transition temperature) may be greater than or equal to about −30.degree. C. Another temperature for shape recovery may be greater than or equal to about 40.degree. C. Another temperature for shape recovery may be greater than or equal to about 70.degree. C. Another temperature for shape recovery may be less than or equal to about 250.degree. C. Yet another temperature for shape recovery may be less than or equal to about 200.degree. C. Finally, another temperature for shape recovery may be less than or equal to about 150.degree. C.

Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether)ethylene vinyl acetate, polyethylene, poly(ethylene oxide)-poly (ethylene terephthalate), polyethylene/nylon (graft copolymer), polycaprolactones-polyamide (block copolymer), poly (caprolactone)dimethacrylate-n-butyl acrylate, poly (norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by thermoelectric cooling, using a cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

As used herein, the term "piezoelectric" is used to describe a material that mechanically deforms (changes shape) when a voltage potential is applied, or conversely, generates an electrical charge when mechanically deformed. Employing the piezoelectric material will utilize an electrical signal for activation. Upon activation, the piezoelectric material can cause displacement in the powered state. Upon discontinuation of the activation signal, the strips will assume its original shape orientation. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVDC"), and their derivatives; polyacrylonitriles ("PAN"), and their derivatives; polycarboxylic acids, including poly(methacrylic acid ("PMA"), and their derivatives; polyureas, and their derivatives; polyurethanes ("PU"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Piezoelectric materials can also comprise metals such as lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as $CdSe$, $CdS$, $GaAs$, $AgCaSe_2$, $ZnSe$, $GaP$, $InP$, $ZnS$, and mixtures thereof. Specific desirable piezoelectric materials are polyvinylidene fluoride, lead zirconate titanate, and barium titanate.

Electroactive polymers include those polymeric materials that exhibit piezoelectric, pyroelectric, or electrostrictive properties in response to electrical or mechanical, fields. The materials generally employ the use of compliant electrodes that enable polymer films to expand or contract in the in-plane directions in response to applied electric fields or mechanical stresses. An example is an electrostrictive-grafted elastomer with a piezoelectric poly(vinylidene fluoride-trifluoro-ethylene)copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape orientation sufficient to provide displacement. Reversing the polarity of the applied voltage to the EAP can provide shape reversibility.

Materials suitable for use as the electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 megaPascals (MPa). In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable MR fluid materials include, but are not limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron;

nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Average dimension sizes for the particles can be less than or equal to about 1,000 micrometers, with less than or equal to about 500 micrometers preferred, and less than or equal to about 100 micrometers more preferred. Also preferred is a particle dimension of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, or other polymeric materials described herein.

Ionic polymer metal composites (IPMCs) are an example of a composite of an active material (e.g., electroactive ionic polymer) with a non-active material (e.g., metal). IPMCs generally show large deformation in the presence of low applied voltage and exhibit low impedance. As an example, an IPMC can comprise a solid polymeric electrolytic element sandwiched between a working electrode and a counter electrode. The solid polymer electrolyte material may be an ion-exchange resin such as, for example, a hydrocarbon- or a fluorocarbon-type resin, or any of the electroactive polymeric materials described herein. Preferably, the solid polymer electrolyte material is a fluorocarbon-type ion-exchange resin having sulfonic, carboxylic, and/or phosphoric acid functionality. Fluorocarbon-type ion-exchange resins may include hydrates of a tetrafluoroethylene-perfluorosulfonyl ethoxyvinyl ether or tetra fluoroethylene-hydroxylated(perfluoro vinyl ether)copolymers. Such resins typically exhibit excellent resistance to oxidation induced by contact with halogens, strong acids, and bases.

Both the working electrode and counter electrode may comprise sheets of material through which an electrical charge can be distributed. Materials from which the electrodes can be fabricated include, but are not limited to, platinum, palladium, rhodium, iridium, ruthenium osmium, carbon, gold, tantalum, tin, indium, nickel, tungsten, manganese, and the like, as well as mixtures, oxides, alloys, any of the other electrode materials described herein, and combinations comprising at least one of the foregoing materials. Preferably, the electrodes comprise platinum.

Advantageously, the above noted mirror assemblies utilizing the active materials described herein do not require motors and in many embodiments gears. Since motors are not necessarily utilized, the shape and/or position adjustment mechanism can be compact, low cost, quiet, and/or lightweight. While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A manipulable automotive mirror assembly adapted for use with a vehicle, said assembly comprising:

a reflective surface defining a first position and reflective angle:
a reconfigurable housing fixedly secured to the reflective surface; and
an actuator including a first active material element operable to undergo a first reversible change in a fundamental property of the first active material when exposed to or occluded from an activation signal, and drivenly coupled to the housing,
wherein the first reversible change is operable to cause or enable the housing to be manipulated, and manipulating the housing causes the reflective surface to achieve a second position or angle.

2. The assembly as claimed in claim 1, wherein the housing defines at least one pivot axis, and the change causes or enables at least a portion of the housing to pivot about said at least one axis.

3. The assembly as claimed in claim 2, wherein the element includes a plurality of wires configured to effect differing angular moments about the axis.

4. The assembly as claimed in claim 1, wherein at least a portion of the housing defines a fold line, and the change causes or enables said at least portion to fold about the line.

5. The assembly as claimed in claim 4, wherein said at least portion presents a resistance to folding and comprises a second active material element operable to undergo a second reversible change in fundamental property when exposed to or occluded from a second activation signal, and the second change modifies the resistance.

6. The assembly as claimed in claim 1, wherein the housing includes telescoping parts, and the first reversible change causes or enables the telescoping parts to relatively extend or retract.

7. The assembly as claimed in claim 6, wherein the first reversible change releases stored energy, and the releasing of the stored energy causes the telescoping parts to relatively extend or retract.

8. The assembly as claimed in claim 7, wherein the actuator further includes a spring, and a latch releasably engaged with the spring.

9. The assembly as claimed in claim 8, wherein the actuator includes a second active material element operable to undergo a second reversible change in a fundamental property when exposed to or occluded from a second activation signal, and drivenly coupled to the latch, such that the second reversible change causes the latch to disengage from the spring to release the stored energy to cause the telescoping parts to relatively extend or retract.

10. The assembly as claimed in claim 1, wherein the actuator further includes a transmission intermediate the element and housing.

11. The assembly as claimed in claim 10, wherein the transmission includes input and driven gears, the driven gear is fixedly coupled to the housing and driven by the input gear, and the input gear is drivenly coupled to the element and defines top and bottom halves.

12. The assembly as claimed in claim 11, wherein the element is drivenly coupled to the top half of the drive gear.

13. The assembly as claimed in claim 1, wherein the actuator further includes at least one pulley and the element presents a wire entrained by the pulley.

14. The assembly as claimed in claim 13, wherein the element presents a wire configuration, and the actuator further includes a steel cable longitudinally coupled to the wire.

15. The assembly as claimed in claim 1, further comprising:
a return mechanism drivenly coupled to the housing and antagonistic to the element, such that the reflective surface returns to the first position and/or angle, when the change is reversed.

16. The assembly as claimed in claim 15, wherein the element includes at least one spring presenting first and second spring moduli corresponding to activation and deactivation respectively, and the return mechanism includes a return spring presenting a third spring modules greater than the second but not the first modulus.

17. The assembly as claimed in claim 1, wherein the first active material element includes an active material selected from the group consisting of shape memory alloys, ferromagnetic shape memory alloys, magnetorheological fluids, magnetorheological elastomers, electrorheological fluids, electrorheological elastomers, electroactive polymers, piezoelectric materials, and a combination thereof.

18. The assembly as claimed in claim 1, wherein the activation signal comprises a thermal activation signal, a magnetic activation signal, an electrical activation signal, and mechanical activation signal, a pneumatic activation signal, or a combination comprising at least one of the foregoing activation signals.

19. The assembly as claimed in claim 1, further comprising:
a controller communicatively coupled to the first active material element; and
a motion or distance sensor in operative communication with the controller, wherein the motion or distance sensor is to detect an other vehicle within a blind spot of the vehicle and provide information to the controller in response to the detection, and the controller is operable to selectively produce the activation signal when the information is provided.

20. The assembly as claimed in claim 1 wherein the fundamental property is a chemical or intrinsic physical property of the first active material.

* * * * *